United States Patent [19]

Hendrickson

[11] 4,305,490
[45] Dec. 15, 1981

[54] SYNCHRONIZED HUB CLUTCH

[75] Inventor: Richard T. Hendrickson, South Bend, Ind.

[73] Assignee: The Bendix Corporation, Southfield, Mich.

[21] Appl. No.: 115,452

[22] Filed: Jan. 25, 1980

[51] Int. Cl.³ .............. F16D 23/06; B60K 17/34; B60B 27/02
[52] U.S. Cl. .................. 192/53 E; 180/247; 192/49; 192/53 F; 301/1; 403/1
[58] Field of Search .............. 192/53 E, 53 F, 49; 180/247; 301/1; 403/1

[56] References Cited

U.S. PATENT DOCUMENTS

| 2,037,305 | 4/1936 | Behrens | 192/49 |
| 2,770,150 | 11/1956 | Culverwell | 180/247 X |
| 3,123,169 | 3/1964 | Young et al. | 180/247 |
| 3,221,832 | 12/1965 | Holmstrom | 180/247 |
| 3,221,851 | 12/1965 | Vandervoort | 192/53 F |

Primary Examiner—Allan D. Herrmann
Attorney, Agent, or Firm—Paul David Schoenle; Ken C. Decker

[57] ABSTRACT

A remotely controlled manual hub clutch assembly includes an axle and a wheel hub rotatably mounted on a vehicle housing. A pair of relatively movable coupling portions provide an engageable and disengageable driving connection between the axle and the wheel hub. The vehicle operator may engage and disengage the coupling members by moving a linkage connected to a movable one of the coupling members. A synchronizer prevents engagement of the coupling members until the rotation speeds of the wheel hub and the axle are substantially equalized so that the hub clutch can be engaged or disengaged while the vehicle is in motion. A non-rotating sleeve surrounds the axle and acts as a linkage to operate the coupling members.

9 Claims, 2 Drawing Figures

SYNCHRONIZED HUB CLUTCH

BACKGROUND OF THE INVENTION

This invention relates to hub clutches for the front wheels of a four-wheel drive vehicle.

To operate a typical manual hub clutch, the vehicle operator must manually turn the hubs at each front wheel to an engaged or disengaged position. However, to do this, the vehicle operator must leave the cab of the vehicle. A remotely controlled hub clutch mechanism is disclosed in U.S. Application Ser. No. 56,483 filed July 11, 1979, however, to prevent damage to the clutch teeth of this hub clutch mechanism the mechanism may be engaged only when the vehicle is stopped to assure synchronization of the clutch teeth. Automatic free wheeling hub clutches are engaged or disengaged by over-running clutch arrangements which operate automatically in response to the relative rotation of portions of these clutch assemblies when the vehicle is in motion. Such automatic free wheeling hubs are not entirely reliable because they may inadvertently cut in or out of engagement at undesirable times under certain driving conditions such as loss of traction due to road conditions or when a wheel loses contact with the road surface. Such automatic hub clutches also tend to become noisy during operation as a result of wear. Accordingly, a remotely controlled manual hub clutch mechanism which may be operated while the vehicle is in motion is desired.

SUMMARY OF THE INVENTION

A synchronized hub clutch mechanism for the front wheels of a four-wheel-drive vehicle includes a pair of meshable, toothed coupling members mounted for rotation with the vehicle wheel hub and axle, respectively. The vehicle operator engages and disengages the coupling members by movement of a linkage connected to one of the coupling members. A clutch ring with a first friction surface rotates with the wheel hub. A blocking ring rotates with the axle and includes a second friction surface which is engageable with the first friction surface to equalize the rotation speed of the axle and wheel hub so that the coupling members may be engaged and disengaged while the vehicle is in motion.

An advantage of this invention is that a manually operated, positively acting hub clutch mechanism is synchronized so that the hub clutch may be engaged and disengaged while the vehicle is in motion or at rest.

DETAILED DESCRIPTION

Figure 1:
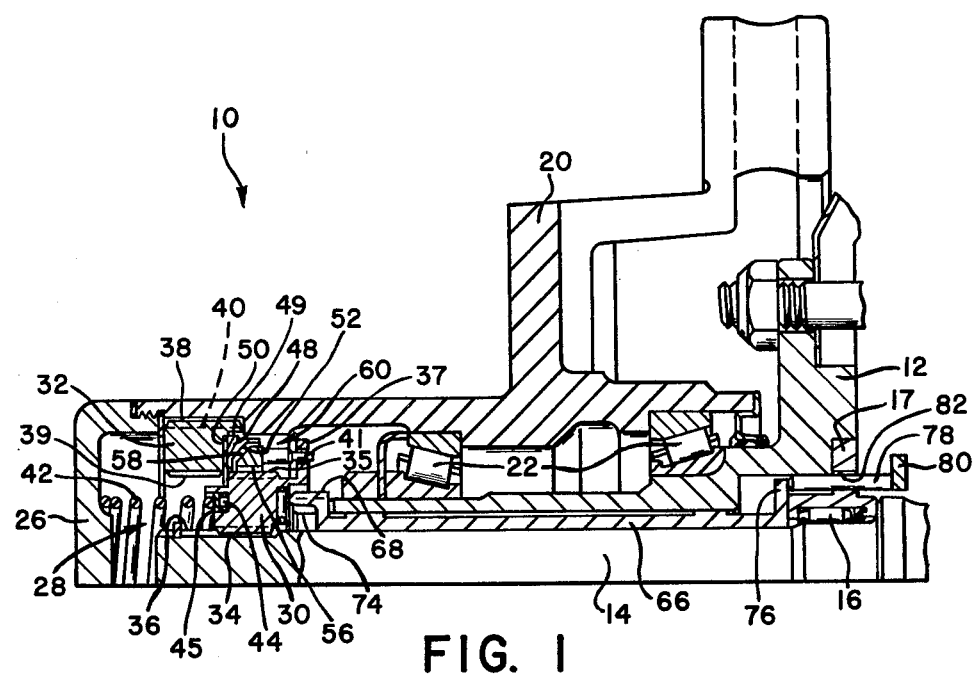
FIG. 1 is a sectional view of applicant's hub clutch in a disengaged position.

A vehicle hub assembly 10 includes a non-rotating housing 12 fixed relative to the vehicle (not shown). Axle or shaft 14 is rotatably and coaxially mounted in the housing 12 by bearing 16 in bearing race 17. Wheel support member or wheel hub member 20 is rotatably and coaxially mounted on housing 12 by bearings 22. Cap 26 fits onto wheel hub 20 to protect the interior of the hub assembly 10 from the environment.

An engageable and disengageable driving connection between axle 14 and wheel hub 20 is provided by clutch mechanism 28. Clutch mechanism 28 includes a sliding toothed coupling member 30 and a fixed toothed coupling member 32. Sliding coupling member 30 includes internal splines 34 for matching engagement with external splines 36 on axle member 14 and coupling teeth 35 for coupling with fixed coupling member 32. The splines 34, 36 are oriented to permit axial translation of the coupling member 30 with respect to axle member 14, but to prevent rotation of coupling member 30 relative to axle member 14. Coupling member 30 includes a flange-shaped member 37 extending therefrom. A plurality of axially extending chamfered bores 41 extend through flange 37. Fixed coupling member 32 includes outer splines 38 for matching engagement with inner splines 40 of wheel hub 20 and coupling teeth 39 for coupling with coupling teeth 35 of sliding coupling member 30. The engaging edges of coupling teeth 35 and 39 are rounded for smooth coupling. The splines 38, 40 mate so that coupling member 32 rotates with wheel hub 20. Return spring 42 is biased to urge sliding coupling member 30 away from fixed coupling member 32 and out of coupling engagement therewith. Needle bearing 44 and washer 45 permits relative rotation between the spring 42 and inner coupling member 30.

Figure 2:
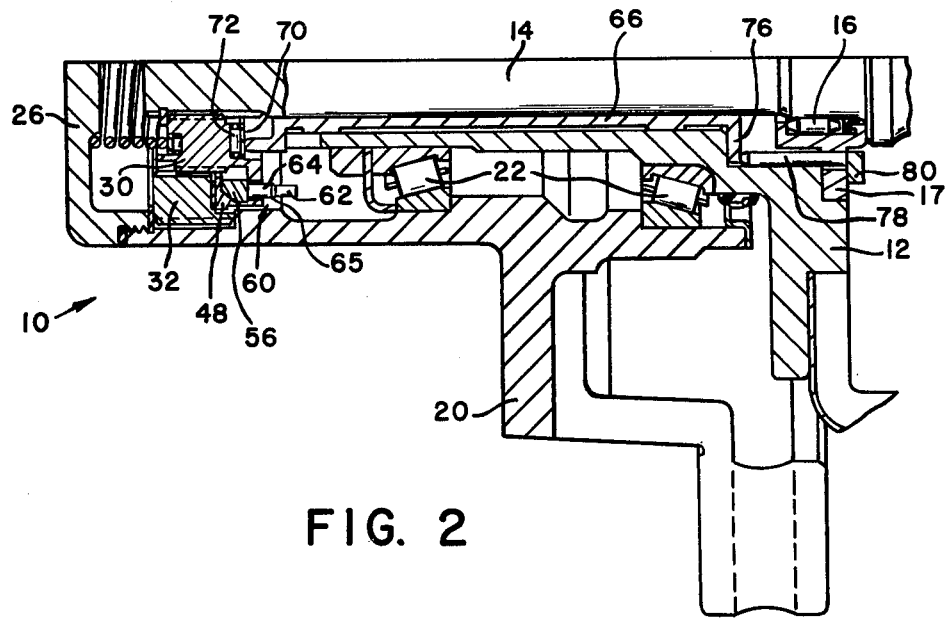
FIG. 2 is a sectional view of applicant's hub clutch in an engaged position.

A clutch ring 48 coaxially surrounds axle 14 and is splined at 49 for rotation with fixed coupling member 32. Shim 50 axially spaces clutch ring 48 apart from fixed coupling member 32. Clutch ring 48 includes an inwardly facing frustoconical clutch surface 52. A blocking ring 56 coaxially surrounds axle 14 and sliding coupling member 30. Blocking ring 56 includes an outwardly facing frustoconical clutch surface 58 which is engageable with clutch surface 52 of ring 48. A plurality of stepped pins 60 extend axially from ring 56 and may be received in axial bores 41 of member 37. Stepped pins 60 include smaller and larger diameter portions 62 and 64 interconnected by an annular chamfered abutment surface 65. The smaller diameter portions 62 of pins 60 have a relatively large clearance with the walls of bores 41 to permit a predetermined amount of relative rotation between blocking ring 56 and sliding coupling member 30 when pin portions 62 are received by bores 41, as best shown in FIG. 1. The relatively smaller clearance between the walls of bores 41 and the larger diameter portions 64 of pins 60 maintains blocking ring 56 and sliding coupling member 30 in a substantially fixed relative position when pin portions 64 are received by bores 41, as best shown in FIG. 2.

A non-rotating cylindrical sleeve 66 is coaxially mounted around rotatable shaft or axle 14 in the annular space between axle 14 and housing 12. The outboard end of sleeve 66 includes tabs 68 which engage a washer 70 and a needle bearing 72 adjacent sliding coupling member 30 so that coupling member 30 may freely rotate relative to non-rotating sleeve 66. Slots 74 in housing cooperate with tabs 68 to prevent rotation of sleeve 66. The inboard end of sleeve 66 terminates in flange 76. Pins 78 extend from actuation plate 80 through bores 82 in bearing race 17 and engage flange 78. Actuation plate 80 may be connected to a linkage including a bell crank such as is described in U.S. Application Ser. No. 56,483, filed July 11, 1979, so that the coupling members 30 and 32 may be engaged and disengaged by the vehicle operator from the cab or operator's compartment of the vehicle (not shown). Similarly, the sleeve 66 may be replaced with a hydraulic linkage, such as is also disclosed in Application Ser. No. 56,483.

MODE OF OPERATION

Applicant's hub clutch mechanism operates as follows: First, assume the transfer case (not shown) is shifted so that the vehicle is in the two-wheel drive mode. In this situation, the front drive shaft (not shown) and the front axle, including axle member 14 are disengaged from the transmission (not shown). The hub assembly, one of which is associated with each of the front wheels (not shown) is in the state shown in FIG. 1 with coupling member 30 disengaged from coupling member 32 by return spring 42. If the vehicle were to move in this condition, the wheel hub 20 would freely rotate on housing 12. But since clutch mechanism 28 is disengaged, axle member 14 would not be forced to rotate with wheel hub 20. Thus, axle member 14, bearings 16, the front differential gear (not shown), and the front drive shaft would not be subject to wear.

The vehicle may be shifted from the two-wheel drive mode to the four-wheel drive mode while the vehicle is at rest or in motion by shifting the transfer case to four-wheel drive and by engaging clutch mechanism 28. Shifting the transfer case to four-wheel drive engages the front wheel drive shaft, as well as the rear drive shaft, with the vehicle transmission. Engaging clutch mechanism 28 couples wheel hub 20 to the front drive shaft through axle member 14 and the front differential gear.

The hub clutch mechanism 28 is engaged by applying a force to plate 80 which shifts actuation plate 80, sleeve 66, and sliding coupling member 30 to the left from the disengaged position shown in FIG. 1 to the position shown in FIG. 2. Shifting plate 80 to the left also moves sleeve 66 and sliding coupling member 30 to the left against the bias of return spring 42 thus preventing engagement of teeth 35 and 39. The movement of sliding coupling member 30 to the left causes engagement of clutch surfaces 52 and 58 of clutch and blocking rings 48 and 56. If this movement is accomplished while the vehicle is in motion, then it is possible for the wheel hub 20 and the shaft 14 to rotate at different speeds. This rotation speed differential and the friction between clutch surfaces 52 and 58 loads small diameter portion 62 of pins 60 against the walls of bores 41 in flange 37 so that abutment 65 engages flange 37 and prevents further leftward movement of sliding coupling member 30, thus preventing engagement of teeth 35 and 39. Eventually, the friction between clutch surfaces 52 and 58 equalizes the rotation speeds of coupling members 30 and 32. Equalization of the rotation speeds unloads the pins 60 from against the walls of bores 41 so that the large diameter pin portions 64 may enter bores 41 and so that coupling member 30 may continue its leftward movement. As coupling member 30 continues to the left, coupling teeth 35 mesh with coupling teeth 39 of fixed coupling member 32 and bores 41 pass over abutments 65 and receive large diameter portions 64 of pins 60. At this point coupling members 30 and 32 are meshed, the hub clutch mechanism is in the coupled position and torque may be transferred between the shaft 14 and the wheel hub 20.

When it is desired to uncouple the applicant's hub clutch mechanism, the operator terminates the force which urges plate 80, sleeve 66 and coupling member 30 to the left. With this force removed return spring 42 moves sliding coupling member 30 to the right and out of meshing engagement with fixed coupling member 32 and into the uncoupled position shown in FIG. 1. With the hub clutch uncoupled, the wheel hub 20 may freely rotate without forcing shaft 14 to also rotate. In this manner, the applicant's hub clutch may be engaged and disengaged while the vehicle is in motion or at rest.

I claim:

1. A hub clutch mechanism for a wheeled vehicle having a wheel support member rotatably mounted on the vehicle, a shaft member for transmitting torque to and from the wheel support member, coupling means for engaging and disengaging the wheel support member with the shaft member and linkage means with a first end and with a second end connected to the coupling means for engaging and disengaging the coupling means in response to operator input signals applied to the first end thereof, characterized by:

synchronizing means for preventing engagement of the coupling means unless the rotation speed of the shaft member is substantially equal to the rotation speed of the wheel support member so that the coupling means may be engaged and disengaged while the vehicle is in motion;

the coupling means comprising a first coupling member mounted for rotation with one of the shaft and wheel support members, and a second coupling member mounted for rotation with the other of the shaft and wheel support members, the coupling members being engageable and disengageable in response to movement of the linkage means; and the synchronizing means comprising a ring member mounted coaxially with respect to the shaft member and having a clutch surface thereupon, one of the ring and first coupling members having an axial bore defined therewithin, the other of the ring and first coupling members having a pin extending therefrom and received by the axial bore, and a clutch member mounted coaxially with respect to the shaft member, mounted for rotation with the second coupling member and having a clutch surface thereupon for frictional engagement with the ring member clutch surface to equalize the rotation speeds of the first and second coupling members.

2. The synchronizing means of claim 1, wherein:
    the pin comprises a larger diameter portion and a smaller diameter portion projecting therefrom, the smaller diameter portion having a diameter smaller than the diameter of the axial bore to permit a limited relative rotation of the ring member relative to the first coupling member, the larger diameter pin portion being received by the axial bore to permit coupling of the coupling members when the rotation speeds of the coupling members are substantially the same.

3. The synchronizing means of claim 1, wherein:
    the first coupling member is mounted for rotation with and for axial translation with respect to the shaft member.

4. The synchronizing means of claim 1, wherein:
    the pin extends from the ring member.

5. The hub clutch mechanism of claim 1, wherein:
    the linkage means comprises a cylindrical sleeve coaxially mounted around the shaft member and engageable with one of the first and second coupling members, the sleeve being movable axially to move the one coupling member into and out of engagement with the other coupling member.

6. The hub clutch mechanism of claim 5, further comprising:

resilient means biased to urge the one coupling member out of coupling engagement with the other coupling member.

7. The hub clutch mechanism of claim 1, wherein: the linkage means comprises a cylindrical sleeve coaxially mounted around the shaft member with a first end engageable with the coupling means and movable axially to engage and disengage the coupling means, and an actuation plate engageable with a second end of the sleeve, the actuation plate moving to translate the sleeve in response to the operator input signals.

8. The hub clutch mechanism of claim 7, further comprising:
a housing fixed relative to the vehicle and having a bore therewithin through which extends the shaft member;
shaft bearings for rotatably supporting the shaft member within the housing bore, the cylindrical sleeve being disposed within the housing bore between the shaft member and the housing, the sleeve having a first end engageable with the coupling means and having a second end, the shaft bearings being disposed between the actuation plate and the second end of the sleeve.

9. A hub clutch mechanism for a wheeled vehicle comprising:
a housing having a bore therewithin;
a wheel support member rotatably mounted on the housing;
a shaft member for transmitting torque to and from the wheel support member;
coupling means for coupling and uncoupling the shaft and wheel support members, the coupling means comprising a first coupling member mounted for rotation with the wheel support member and a second coupling member mounted coaxially with respect to the shaft member and movable axially into and out of engagement with the first coupling member;
linkage means with an end connected to the second coupling member for engaging and disengaging the coupling means in response to operator input signals applied to the other end thereof; and
synchronizing means for preventing engagement of the coupling means unless the rotation speed of the shaft member is substantially equal to the rotation speed of the wheel support member so that the coupling means may be engaged and disengaged while the vehicle is in motion, the synchronizing means comprising a first ring member mounted for rotation with the second coupling member, the first ring member having a pin extending axially therefrom and having a first clutch surface thereupon, a second ring member extending from the first coupling member, the second coupling member having an axial bore therewithin for receiving the pin and the second ring member having a second clutch surface engageable with the first clutch surface.

* * * * *